United States Patent
Yang et al.

(10) Patent No.: US 7,263,096 B2
(45) Date of Patent: Aug. 28, 2007

(54) APPARATUS, SYSTEM AND METHOD FOR MANAGING CIRCUIT AND PACKET-SWITCHED CALLS ON A NETWORK

(75) Inventors: ZhongJin Yang, Naperville, IL (US); Jie Yao, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1050 days.

(21) Appl. No.: 10/200,346

(22) Filed: Jul. 22, 2002

(65) Prior Publication Data

US 2003/0118006 A1   Jun. 26, 2003

Related U.S. Application Data

(63) Continuation-in-part of application No. 10/027,761, filed on Dec. 21, 2001, now Pat. No. 7,106,727.

(51) Int. Cl.
*H04L 12/66* (2006.01)

(52) U.S. Cl. ...................................... 370/353

(58) Field of Classification Search ........ 370/351–353, 370/355, 356
See application file for complete search history.

(56) References Cited

U.S. PATENT DOCUMENTS

| | | | | |
|---|---|---|---|---|
| 5,130,982 A | * | 7/1992 | Ash et al. | 370/352 |
| 5,867,495 A | * | 2/1999 | Elliott et al. | 370/352 |
| 6,744,732 B1 | * | 6/2004 | Pfenning et al. | 370/235 |

* cited by examiner

*Primary Examiner*—Doris H. To
*Assistant Examiner*—Kerri M Rose

(57) ABSTRACT

Resources within a hybrid packet-circuit network are dynamically reallocated based on demand. In response to an edge switch requesting additional first resources, a network manager evaluates a plurality of possible communication paths and potential network changes to determine an optimum configuration for providing the additional first resources. Network switches are instructed by the network manager to reallocate second resources such as packet-switched resources to first resources such as circuit-switched resources.

20 Claims, 4 Drawing Sheets

FIG. 2
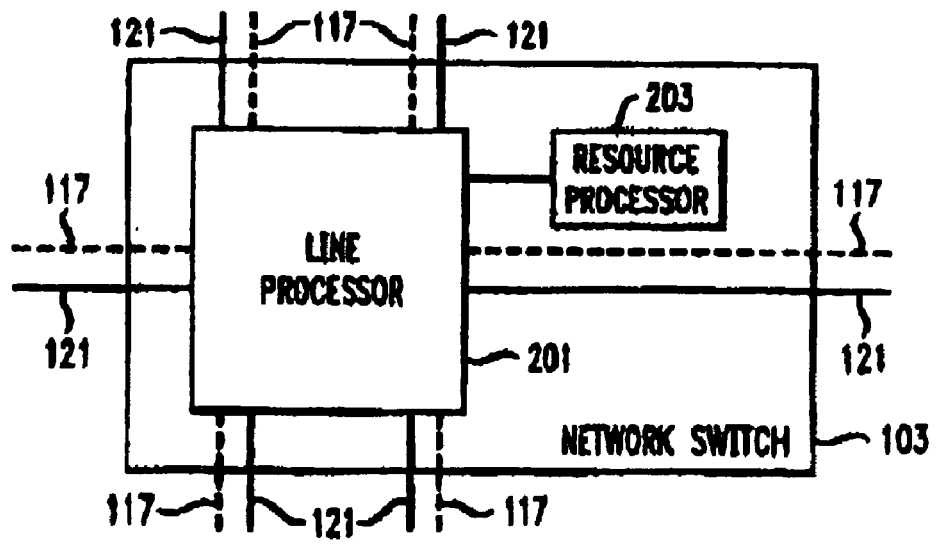
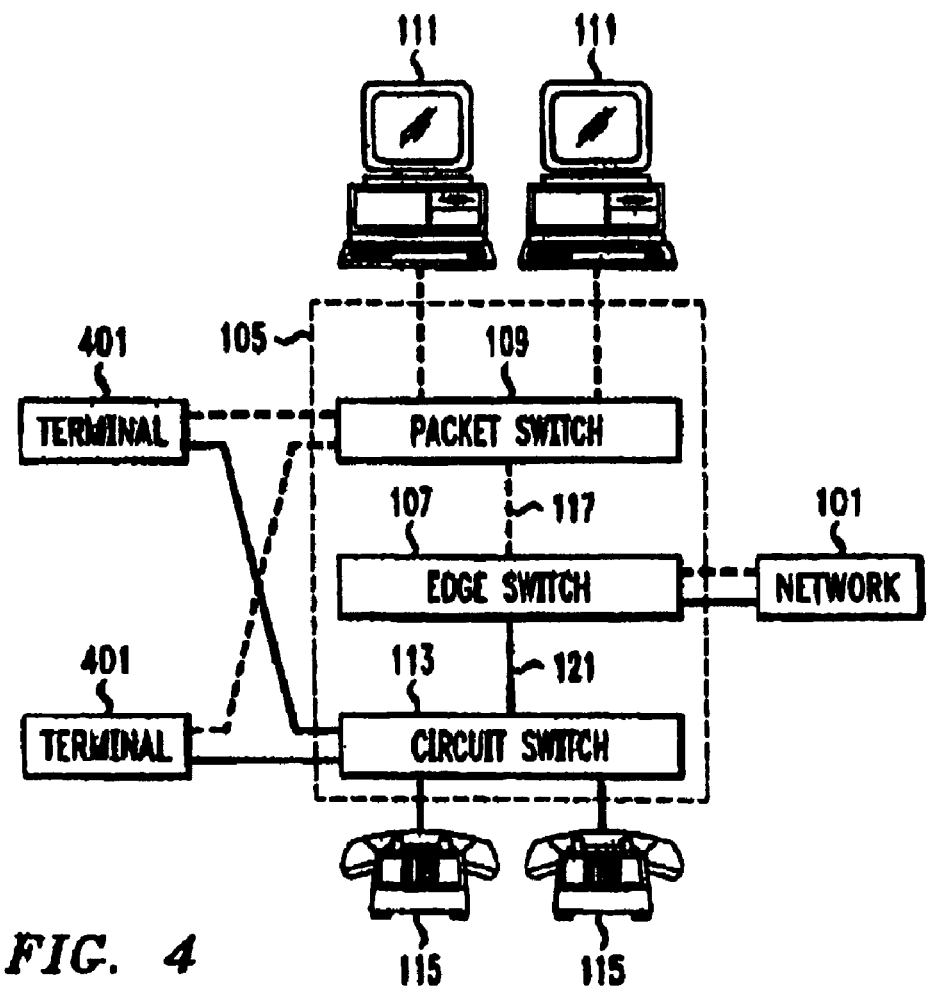
FIG. 4

APPARATUS, SYSTEM AND METHOD FOR MANAGING CIRCUIT AND PACKET-SWITCHED CALLS ON A NETWORK

RELATED PATENT APPLICATIONS

This patent application is a Continuation In Part application of U.S. patent application Ser. No. 10/027,761 entitled "Method and Apparatus For Providing Circuit And Packet-Switched Calls On A Network", filed on Dec. 21, 2001 now U.S. Pat. No. 7,106,727 and incorporated in its entirety herein.

BACKGROUND OF THE INVENTION

This invention relates generally to communication systems and more specifically to systems, apparatuses and methods for managing circuit-switched and packet-switched calls on a network.

Conventional formats for transporting data in communications networks include circuit-switched and packet-switched techniques. Circuit-switched networks are more reliable than packet-switched networks for real-time applications and those requiring a guaranteed quality of service, such as voice and video, whereas packet-switched networks are more efficient at transmitting data, including email and internet data exchange applications. Circuit switching is used in traditional voice telephone technologies. Packet switching has emerged as the preferred method for data technologies, such as computer-to-computer communications.

Resources are dedicated for a circuit-switched call when the call is set up and remain assigned until the call is completed. Circuit-switched calls have end-to-end resources with a fixed bandwidth allocated for the entire call and typically do not need information, such as headers, above Layer 1. Circuit-switched calls tend to be more expensive because of dedicated bandwidth to the call even if the bandwidth is not required during a particular portion of the call. Typically, circuit-switched resources are required even during silent periods when no information is being exchanged.

Resources are not dedicated for packet-switched calls. The information content of packet-switched calls is divided into packets that are routed based on their destination and repackaged at intermediate network elements for transmission. Packet-switched calls require transmission of information, such as headers, above Layer 1 to determine the destination and/or path for the data. When the network becomes overburdened, packets may be buffered in network elements and/or dropped. Buffering causes transmission delays, possible receipt of packets out of order, and packet loss and often results in deterioration less than adequate quality for real-time applications. For non-real-time applications, packets received out of order may be reordered by a higher layer protocol, and retransmission of missing packets upon request is employed by standard higher layer packet protocols. For non-real-time applications, delays due to retransmission and reordering of packets are acceptable, but such delays may severely affect the quality of service for real-time applications. Packet-switched calls cannot provide a guaranteed level of quality for real-time applications, and the quality deteriorates as traffic in the network increases. Packet-switched calls tend to be less expensive than circuit-switched calls because of sharing of available resources and bandwidth.

Conventional networks are designed either exclusively for circuit switching or exclusively for packet switching. A network service provider typically builds two separate networks, a circuit-switched network for voice calls and a packet-switched network for data calls. Thus, e-mail is sent over the packet-switched network, because sending an email over a circuit-switched network is wasteful, and voice calls are sent over the circuit-switched network, because sending a voice call over a packet-switched network results in poor quality of service, marked by distortions or gaps. Supporting and operating two separate networks increases the cost and complexity of today's networks.

Therefore, there is a need for an efficient system, apparatus and method for managing networks utilizing circuit-switched and packet-switched resources.

SUMMARY

In an exemplary embodiment of the invention, a network utilizing packet-switched and circuit-switched resources is efficiently managed by dynamically reallocating resources based on communication traffic demands. In response to detecting an insufficiency of first resources (such as circuit-switched resources) between two switches, a network manager determines an optimum network configuration by evaluating a plurality of communication paths between the switches and potential network changes for providing the additional first resources. The network manager instructs network switches to reallocate resources to increase first resources between the two switches.

BRIEF DESCRIPTION OF THE DRAWINGS

FIG. 2 is a block diagram of a network switch in accordance with the exemplary embodiment of the invention.

FIG. 4 is a block diagram of a local switch and its peripheral devices in accordance with the invention.

DESCRIPTION OF A PREFERRED EMBODIMENT

In the exemplary embodiment of the invention, a hybrid circuit-packet network is managed to dynamically reallocate resources to efficiently provide communication services. In response to a request from an edge switch to allocate additional resources between a first edge switch and second edge switch, a network manager evaluates a plurality of potential communication paths between the switches and the potential network configurations to provide the additional resources. After determining the optimum network configuration, the network manger instructs the appropriate switches to reallocate resources. Network information is maintained in a database that is accessed and updated by the network manager.

Figure 1:
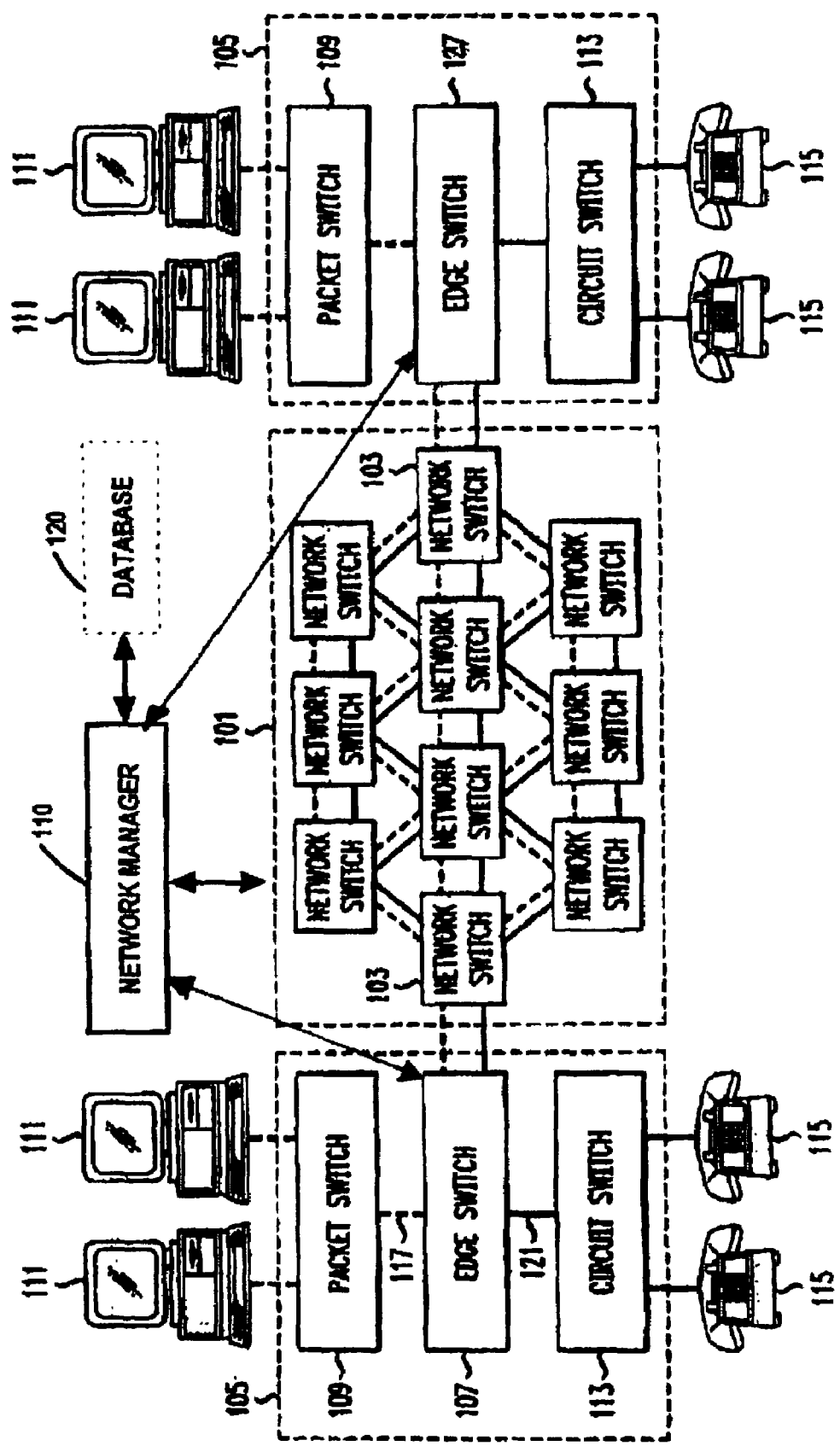
FIG. 1 is a block diagram of a communication network with circuit-switched resources and packet-switched resources in accordance with an exemplary embodiment of the invention.

FIG. 1 is block diagram of a communication system 100 supporting circuit-switched resources and packet-switched resources in accordance with the exemplary embodiment of the invention. The communication system 100 comprises a plurality of interconnected network switches 103 in a network 101, access networks 105, and network resources, including circuit-switched resources and packet-switched resources. A network manager 110 manages the resources in the network 101 by allocating and reallocating the resources linking the switches 103 between circuit-switched resources and packet-switched resources. Although a particular number of network switches 103 and pattern of interconnections between them is shown in FIG. 1, any number of network switches 103 and any pattern of interconnections may be utilized while successfully practicing the invention. Further, each network switch 103 may include interfaces for communicating with another network switch 103 and with one or more edge switchs 107, 127. A number of physical resources, such as OC3 connections, OC12 connections, OC48 connections, OC192 connections, T1/E1 connections, T3/E3 connections are allocated between the network switches 103 and the access networks 105. The physical resources may be defined according to any number of protocols such as SONET (Synchronized Optical Network) and SDH (Synchronized Digital Hierarchy) as known in the art. Any type of physical communication resource utilizing any protocol may be used and implementations are not limited to any particular wireless, wireline, copper, or fiber optic resource. In the exemplary embodiment, circuit-switched and packet-switched resources are provided between each adjacent pair of network switches 103, and each physical resource is capable of handling circuit-switched and packet-switched formats.

The network manager 110 communicates with every network switch 103 in the network 101 and every edge switch 107 connected to the network 101 in the exemplary embodiment. Although FIG. 1 illustrates a single communication connection between the network manager 110 and the network 101. Those skilled in the art will recognize the various techniques that can be used to establish communications between each of the network switches 103 and the network manager 110.

One or more access networks 105 are interconnected to the network switches 103. An access network 105 may comprise one or more local switches and/or additional infrastructure, including one or more packet switches 109 and one or more circuit switches 113. The access network 105 typically includes an edge switch 107 (127), also known as an access switch or gateway, that directs calls between the network switches 103 and one or more packet switches 109 and one or more circuit switches 113. The edge switch 107, 127 has a processor that determines traffic distributions or patterns for packet-switched and circuit-switched calls and determines when a reallocation of resources (e.g., those resources linking the access network 105 and a network switch 103) between circuit-switched and packet-switched resources is required or preferred. In the exemplary embodiment, the edge switch 107, 127 sends a request for additional first resources, such as circuit-switched resources, to the network manager 110 in response to a detection of an insufficiency of first resources (circuit-switched resources). The network manager 110 evaluates a plurality of communication paths between the first edge switch 107 and the second edge switch 127 and potential network changes to determine an optimum network configuration for providing the additional resources. The network manger 110 may utilize network information stored in a database 120 to determine the optimum path and the most efficient reallocation of resources throughout the network to meet the request of the edge switch 107. In the exemplary embodiment, a network manager 110 communicates with the edge switches 107, 127 and the network switches 103 to monitor traffic and to provide reallocation instructions to the network switches 103 and edge switches 1-7, 127. The network manger 110 is a process or logic entity running on suitable equipment connected to the network and may be embedded in one of the network switches 103, for example. Based on information received from the edge switches, network switches 103 and information retrieved from the database 120, the network manager 110 determines all the possible communication paths between the first edge switch 107 and the second edge switch 127, evaluates the potential network configurations and calculates the optimum network configuration to provide the additional resources between the two edge switches 102, 127 through the network 101.

The database 120 is illustrated using a box having a dashed line to show that the database 120 may be part of the network manager 110 or may implemented in any part of the communication system 100. The database 120 may store a variety of information and in the exemplary embodiment includes network information such as a list of network switches 103 and edge switches in the network, a capacity of each of the network switches 103, the capacity of the edge switches 107, 127, an arrangement of the network switches 103 including the identification of adjacent network switches 103 in direct communication (not communicating through another switch) and transmission capacities between each pair of adjacent network switches 103 including a current allocation of resources between a packet-switched capacity and a circuit-switched capacity.

After the network switches 103 execute the reallocation instructions, a report is generated and transmitted to the network manager 110 indicating the current status of the switches 103. The network manager 110 accesses the appropriate memory locations to update the database 120. Therefore, the network manager 110 is able to monitor the network 101 and provide dynamic provisioning of resources between circuit-switched and packet-switched and visa versa.

Packet-switched calls enter the network, for example, via computers 111 and other types of data terminals (not shown), and are transferred to the edge switch 107 by one or more packet switches 109 that receive the calls. Packet-switched resources 117 are designated with dashed lines.

Circuit-switched calls enter the network, for example, via telephones 115 and other types of voice and/or video terminals (not shown), and are transferred to the edge switch 107 by one or more circuit switches 113 that receive the calls. Circuit-switched resources 121 are designated with solid lines.

In addition to the telephones 115 and computers 111, other equipment such hybrid terminals (not shown) may be connected to the access network 105. The hybrid terminals may utilize and combination of packet-switched and circuit-switched communication techniques and are, therefore, connected to the packet switches 109 and the circuit switches 113.

FIG. 2 is a block diagram of a network switch 103 in accordance with the exemplary embodiment. The network switch 103 comprises a line processor 201 that interfaces the circuit-switched resources 121 and the packet-switched resources 117 from the adjoining switches 103, 107, 127. The resource processor 203 allocates and reallocates the circuit-switched resources 121 and the packet-switched resources 117 to best meet the current traffic distribution of circuit-switched and packet-switched calls in response to instructions from the network manager 110. The edge switch 107 (127), therefore, detects an insufficiency of resources needed for either a packet-switched call or circuit-switched call and transmits a request for additional resources to be allocated between the edge switch 107 and another edge switch 127. The network manger 110, in response to the request, evaluates the network 110 as described above and reallocates resources in accordance with an efficient network management technique by communicating with the processor 203 in the appropriate network switches 103.

Allocation of resources in the network may be driven by either circuit-switched demands, packet-switched demands, or both. For example, traffic may be measured, e.g., by bit rate, for circuit-switched calls, resources sufficient to process the circuit-switched traffic are assigned as circuit-switched resources, and the remaining resources are allocated as packet-switched resources. Therefore, the communication system 100 guarantees the bandwidth demanded for circuit applications by reducing the resources currently allocated for packet switching when the resources allocated for circuit applications are not sufficient. Alternatively, traffic maybe measured for packet-switched calls, and resources sufficient to process the packet-switched traffic are assigned as packet-switched resources, and the remaining resources are allocated as circuit-switched resources. Likewise traffic may be measured according to both circuit-switched calls and packet-switched calls, and resources are allocated accordingly.

In the exemplary embodiment, the network manager 110 monitors traffic load conditions between each pair of network switches 103. When the traffic load between a pair of switches 103 is below a threshold, the network manager 110 initiates a traffic provisioning command to require the switches 103 to reallocate some circuit-switched resources to packet-switched resources if necessary to improve network performance. Further, the network manager 110, in monitoring the network 101, may detect a significantly non-uniform distribution of resources. As a result, the network manager 110 may initiate a reconfiguration procedure to reduce non-uniformity and optimize the performance of the network 103.

Figure 3:
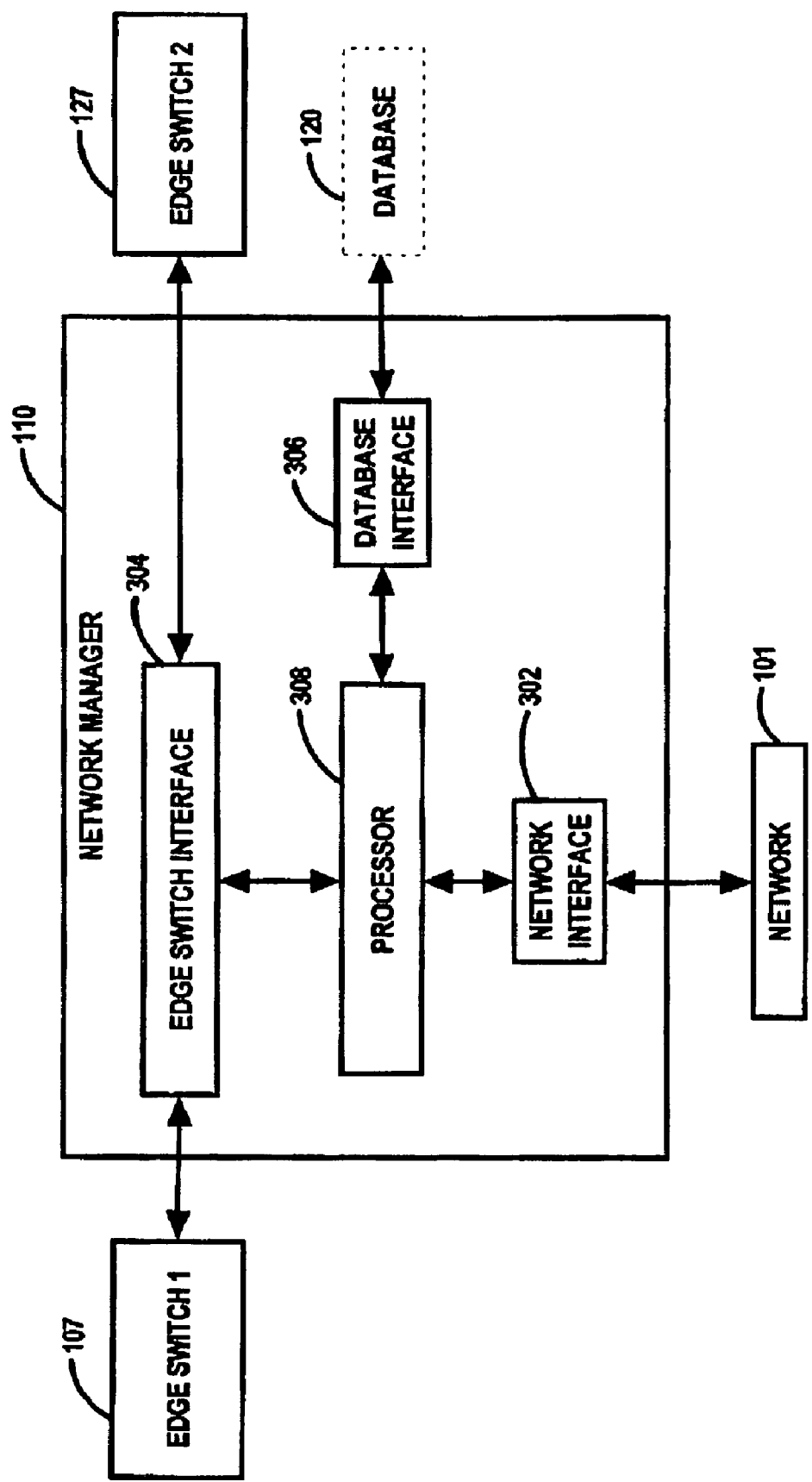
FIG. 3 is a block diagram of a network manager in accordance with the exemplary embodiment of the invention.

FIG. 3 is block diagram of the network manager 110 in accordance with the exemplary embodiment of the invention. The network manager 110 can be implemented using any number of known techniques in accordance with the teachings herein. An example of a suitable implementation includes running software code on a processor or combination of processors within the communication system 100. The network manager 110 may be implemented within one or more of the network switches 103, for example.

In the exemplary embodiment, the network manager 110 includes a interfaces, 302, 304, 306 for communicating with the network 101, the database 120 and the edge switches 107, 127. The interfaces 302, 304, 306 transmit and receive information and perform the necessary translation functions to convey information and control signals to and from a processor 308 within the network manager 110. The interfaces 302, 304, 306 may include any combination of hardware, software and firmware to perform the required interface tasks. The processor 308 communicates through the network interface 302 with the network 101. As explained above, the communication channel between the network manager 110 and the network 101 may include more than one connection to the various network switches 103. Accordingly, the network interface 302 may provide the appropriate signal combinations and signal division to provide an interface from multiple connections to the network switches 103 to the processor 308 in some circumstances. The edge switch interface 304 provides and interface to the edge switches 107, 127 in the communication system 100 and the database interface 306 provides and interface to the database 120. In arrangements where the database 120 is implemented as part of the network manager 110, the database interface 308 may be omitted. Those skilled in the art will recognize that the various functions within the network manger 110 may be implanted using various combinations of software and hardware and that the functional blocks depicted within the network manager 110 may be performed by at least portions of the same equipment or code.

FIG. 4. is a block diagram of a local switch and its peripheral devices in accordance with the exemplary embodiment of the invention. The peripheral devices to the local switch include: computers 111 and other types of data terminals that communicate using packet-switched protocols; telephones 115 and other types of voice and/or video terminals that communicate using circuit-switched protocols; and terminals 401, such as multi-media gateways, that are capable of transmitting according to both packet-switched protocols and circuit-switched protocols and may transmit voice, data, and/or video. Any of the peripheral devices 111, 115, and/or 401 may be utilized to place a multi-media call.

Figure 5:
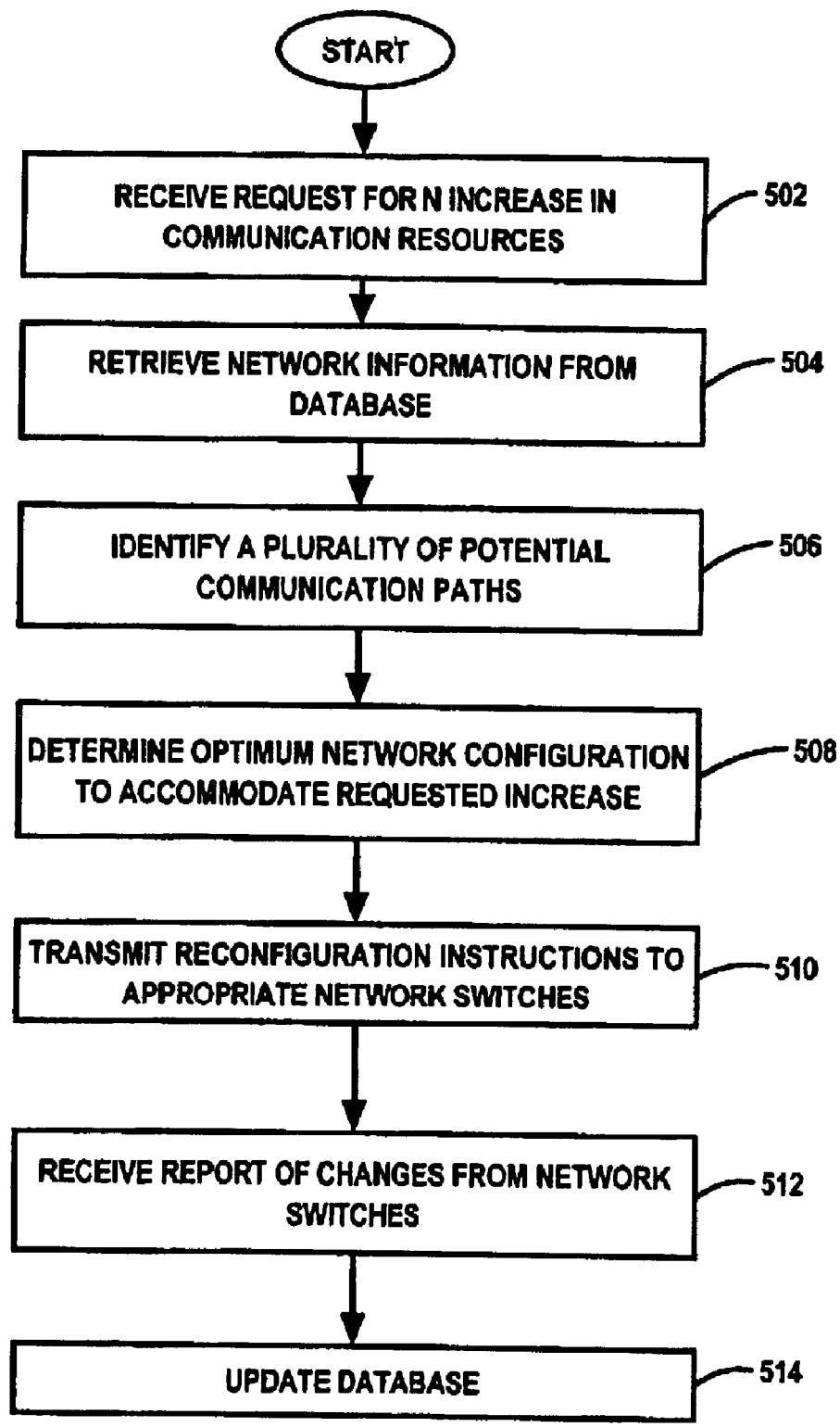
FIG. 5 is a flowchart of method of managing packet-switched and circuit-switched resources of network.

FIG. 5 is a flowchart of a method of allocating circuit-switched resources and packet-switched resources in accordance with the exemplary embodiment of the invention. The method can be performed using a variety of techniques and by any combination of software hardware or firmware within the communication system 100. In the exemplary embodiment, the method is performed by executing software functioning as the network manager 110.

At step 502, the network manger 110 receives a request for N additional communication resources between a first edge switch 107 and second edge switch 127. In the exemplary embodiment, packet-switched call(s) and circuit-switched call(s) are received at the access network 105, for example, by a packet switch 109, a circuit switch 113, and/or edge switch 107. The calls may originate and/or terminate at the access network 105. Traffic is measured periodically or on demand, for example, at the edge switch 107. A measure of received calls is determined by the edge switch and evaluated to determine if additional resources are needed. The measure of calls includes a measure of circuit-switched traffic (circuit channel occupancy/utilization in per cent), a measure of packet-switched traffic (in bits per second), a distribution of traffic between circuit-switched and packet-switched (e.g., by %), a measure of circuit-switched calls (e.g., a count of current circuit-switched calls), a measure of packet-switched calls (e.g., a count of current packet-switched calls), a distribution of calls between circuit-switched and packet-switched (e.g., by % of total bandwidth), and any of measure of traffic or calls as known in the art. For example, traffic may be measured as 12 Mbps circuit-switched and 25 Mbps packet-switched or a percentage allocation between circuit and packet may be utilized, such as 60% circuit and 40% packet. Alternatively, a count of calls at the access network 105 by type may be utilized, such as 123 circuit calls and 68 packet calls. A further measure might be a division of the total number of resources by type, such as 96 circuit resources and 48 resources. The edge switch 107 determines whether a resource allocation threshold is met, i.e., whether a difference in traffic between a previous measure of traffic and the current measure of traffic is sufficient to reallocate resources between circuit-switched and packet-switched resources. For example, if the difference between bandwidth allocated for circuit traffic and the current demand for circuit traffic is greater that the resource allocation threshold, the edge switch determines that resources should be reallocated (or allocated if resources had not been previously allocated). If the threshold is met, the edge switch transmits a request for the additional (N) resources needed to the network manager 110.

At step 504, the network manger 110 retrieves network information from the database 120. The network information may include a variety of performance, configuration, capacity or other data about the network 101. In the exemplary embodiment, the database 120 stores a list of network switches 103 and edge switches in the network, a capacity of each of the network switches 103, the capacity of the edge switches, an arrangement of the network switches 103 including the identification of adjacent network switches 103 in direct communication (not communicating through another switch 103) and transmission capacities between each pair of adjacent network switches 103 including a current allocation of resources between a packet-switched capacity and a circuit-switched capacity.

At step 506, the network manger identifies a plurality of potential communication paths between the first edge switch 107 and the second edge switch 127. The network manger 110 evaluates the network information retrieved from the database 120 to determine all possible communication paths.

At step 508, an optimum network configuration is determined that will accommodate the requested increase of communication resources. In the exemplary embodiment, the processor 308 in the network manger 110 performs and optimization calculation that evaluates each configuration and reallocation of resources along the plurality of communication paths that will provide the additional resources requested by the edge switch 107.

At step 510, reconfiguration instructions are transmitted to the network switches 103 requiring reallocation of resources to implement the optimum network configuration.

At step 512, the network manager 110 receives a report indicating the network changes that have been implemented. After the network switches 103 perform the reconfiguration instructions, each network switch 103 generates and transmits a report indicating the changes.

At step 514, the network manger 110 updates the database 120. Based on the reports received from the network switches 103, the network manager 110 changes the appropriate memory location with the database 120 to reflect the network changes.

The above embodiments describe an allocation of resources between circuit-switched and packet-switched. The present invention may also be applied to additional types of resources, i.e., to allocate and reallocate resources between two or more types of resources.

The teachings herein give service providers the ability to offer both circuit-switched and packet-switched applications on one network to their customers without having to support to separate networks. When traffic patterns change, the network is able to dynamically and efficiently reallocate resources between circuit-switched resources and packet-switched resources to better serve current demands. The circuit-packet network is used efficiently because, for example, unneeded circuit-switched resources are released or reallocated as packet-switched resources as the demand for circuit traffic decreases, and vice versa. Furthermore, service providers need to manage only one physical network, resulting in savings in network infrastructure and management (operation, administration, maintenance, and provision).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for managing a network comprising circuit-switched resources and packet-switched resources, the method comprising:
   detecting an insufficiency of first resources between a first edge switch and a second edge switch via a measure of received calls determined by a detecting edge switch, wherein the measure of received calls comprises a count of current circuit-switched calls and a count of current packet-switched calls;
   determining an optimum network configuration for providing additional first resources between the first edge switch and the second edge switch;
   reallocating second resources to first resources to provide the additional first resources between the first edge switch and the second edge switch;
   wherein the determining the optimum network configuration step further comprises the steps of:
   monitoring a load status of each network switch of a network of network switches between the first edge switch and the second edge switch;
   evaluating the network to identify a plurality of communication paths; and
   calculating a potential change in resources required for each communication path to determine the optimum communication configuration.

2. A method in accordance with claim 1, wherein the monitoring step further comprises the step of:
   communicating with the network switches to obtain the load status of each network switch.

3. A method in accordance with claim 1, wherein the evaluating the network step further comprises the step of retrieving network information from a database.

4. A method in accordance with claim 3, wherein the retrieving step further comprises the step of retrieving a network switch capacity of at least one network switch.

5. A method in accordance with claim 3, wherein the retrieving step further comprises the step of retrieving a current arrangement of the network.

6. A method in accordance with claim 3, wherein the retrieving step further comprises the step of retrieving transmission capacities between at least one adjacent pair of network switches.

7. A method in accordance with claim 1, wherein the first resources are circuit-switched resources and the second resources are packet-switched resources.

8. A method in accordance with claim 1, wherein the detecting an insufficiency of first resources step further comprises the step of receiving a request from the detecting edge switch of the first edge switch and the second edge switch, the detecting edge switch detecting the insufficiency of first resources.

9. A method in accordance with claim 8, wherein the receiving a request step further comprises the step of receiving a request for an increase of a number of first resources.

10. A system for managing a network comprising circuit-switched resources and packet-switched resources, comprising:

an edge switch connected to the network for detecting an insufficiency of first resources between the edge switch and another edge switch via a measure of received calls determined by the edge switch, wherein the measure of received calls comprises a count of current circuit-switched calls and a count of current packet-switched calls;

a network manager for determining an optimum configuration and reallocating packet-switched resources to circuit-switched resources to increase the first resources between the network switches;

wherein the first resources are circuit-switched resources and the second resources are packet-switched resources; and wherein the network comprises a plurality of network switches between the edge switch and the another edge switch, the network manager for monitoring a load status of each network switch of the network, evaluating the network to identify the plurality of communication paths; and calculating a potential change in resources required for each communication path to determine the optimum communication path.

11. A system in accordance with claim 10, wherein the network manager is for communicating with the network switches to obtain the load status of each network switch.

12. A system in accordance with claim 10, further comprising a database for storing network information accessible by the network manager, the network manager for retrieving the network information to evaluate the network.

13. A system in accordance with claim 12, wherein the network information comprises a network switch capacity of at least one network switch.

14. A system in accordance with claim 12, wherein the network information comprises an arrangement of the network.

15. A system in accordance with claim 12, wherein the network information comprises transmission capacities between at least one adjacent pair of network switches.

16. A system in accordance with claim 10, wherein the edge switch is for transmitting a request for an increase of a unit number of first resources.

17. A network manager for managing a network comorising circuit-switched resources and packet-switched resources, the network manager comprising:

an edge switch interface for detecting an insufficiency of circuit-switched resources between a first edge switch and a second edge switch connected to the network via a measure of received calls determined by the edge switch interface, wherein the measure of received calls comprises a count of current circuit-switched calls and a count of current packet-switched calls; and a processor for a) determining an optimum configuration based on an evaluation of a plurality of possible paths between the edge switches and potential resource allocations and b) reallocating packet-switched resources to circuit-switched resources to increase a circuit-switched bandwidth of the optimum path;

the network mancer further comprising a database interface for retrieving network information from a database, the network manger utilizing the network information to determine the optimum network configuration:

wherein the network information comprises a network switch capacity of at least one network switch.

18. A network manager in accordance with claim 17, wherein the network information comprises an arrangement of the network.

19. A network manager in accordance with claim 17, wherein the network information comprises transmission capacities between at least one adjacent pair of network switches.

20. A network manger in accordance with claim 17, wherein the edge switch interface is for detecting the insufficiency of circuit-switched resources by receiving a request from the edge switch.

* * * * *